United States Patent
Tamaoka et al.

(10) Patent No.: US 7,005,768 B2
(45) Date of Patent: Feb. 28, 2006

(54) DYNAMIC BEARING DEVICE, PRODUCING METHOD THEREOF, AND MOTOR USING THE SAME

(75) Inventors: Takehito Tamaoka, Nagano-ken (JP); Tetsuya Kurimura, Mie-ken (JP); Ryouichi Nakajima, Mie-ken (JP)

(73) Assignees: Nidec Corporation, Kyoto (JP); NTN Corporation, Osaka (JP)

( * ) Notice: Subject to any disclaimer, the term of this patent is extended or adjusted under 35 U.S.C. 154(b) by 112 days.

(21) Appl. No.: 10/705,241

(22) Filed: Nov. 12, 2003

(65) Prior Publication Data

US 2004/0145260 A1 Jul. 29, 2004

(30) Foreign Application Priority Data

Nov. 26, 2002 (JP) .............................. 2002-342145
Nov. 27, 2002 (JP) .............................. 2002-343829
Nov. 27, 2002 (JP) .............................. 2002-343835

(51) Int. Cl.
  *H02K 5/12* (2006.01)
  *G11B 17/02* (2006.01)

(52) U.S. Cl. .................. 310/90; 310/67 R; 384/132; 384/133; 360/99.04; 360/99.08

(58) Field of Classification Search .............. 310/90, 310/90.5, 67 R; 360/98.07, 99.04, 99.08, 360/99.09, 99.11; 384/133, 99, 107, 132
See application file for complete search history.

(56) References Cited

U.S. PATENT DOCUMENTS

| | | | | |
|---|---|---|---|---|
| 5,715,116 A * | 2/1998 | Moritan et al. | .......... | 360/99.08 |
| 5,822,846 A * | 10/1998 | Moritan et al. | ............... | 29/598 |
| 5,914,832 A * | 6/1999 | Teshima | .................. | 360/98.07 |
| 6,512,654 B1 * | 1/2003 | Teshima | .................. | 360/99.08 |
| 6,657,340 B1 * | 12/2003 | Obara | .......................... | 310/90 |
| 6,787,954 B1 * | 9/2004 | Yoshitsugu et al. | ........... | 310/90 |

\* cited by examiner

*Primary Examiner*—Darren Schuberg
*Assistant Examiner*—Leda T. Pham
(74) *Attorney, Agent, or Firm*—Arent Fox PLLC

(57) ABSTRACT

A securing surface of a housing comprises a deformation region, which deforms radially outward by a predetermined quantity during press fitting of a thrust member, and another region. The deformation region has a tapered shape that gradually reduces in diameter in the downward direction, and is receded radially inward relative to the other region of the securing surface, by an amount equivalent to the amount of outward deformation thereof during press fitting. When the thrust member is press fitted into the inner periphery of a press fitting portion of the housing, the securing surface of the housing becomes substantially straight along entire axial region L thereof.

21 Claims, 8 Drawing Sheets

DYNAMIC BEARING DEVICE, PRODUCING METHOD THEREOF, AND MOTOR USING THE SAME

BACKGROUND OF THE INVENTION

1. Field of the Invention

The present invention relates to a dynamic bearing device, which rotatably supports an axial member in a non-contact manner by an dynamic pressure action of a lubricating oil generated in a bearing gap, a producing method thereof, and a motor using the same. This bearing device is suitable for use in information-processing equipment, including the spindle motors for magnetic disk devices such as HDD and FDD, optical disk devices for CD-ROM, CD-R/RW, DVD-ROM/RAM, etc. and magneto-optical disk devices for MD, MO, etc., the polygon scanner motors in laser beam printers (LBP), or as small-scale motors for electrical equipment such as axial flow fans.

2. Description of the Related Art

In various types of the motor described above, performances such as increased speed, lower costs, and lower noise generation, in addition to high rotational precision, are required. One of the structural elements that determine these performance requirements is the bearing that supports the spindle of the motor. In recent years, dynamic bearings, which are superior in the above performance requirements, have been investigated, or actually uses, as this kind of bearing.

For example, a dynamic bearing device installed in a spindle motor of a disk drive device, such as HDD, is provided with a radial bearing portion, which rotatably supports an axial member in a non-contact manner in the radial direction, and a thrust bearing portion, which rotatably supports the axial member in a non-contact manner in the thrust direction. The radial bearing portion is constituted with a dynamic bearing, in which grooves for generating the dynamic pressure (dynamic pressure generating grooves) are provided in either an inner peripheral surface of a bearing sleeve or an outer peripheral surface of the axial member. The thrust bearing portion is constituted, for example, with a dynamic bearing, in which dynamic pressure generating grooves are provided in either both end surfaces of a flange portion of the axial member or in the surfaces opposing these end surfaces (such as an end surface of the bearing sleeve, or an end surface of a thrust member fixed to a housing) (for an example, see Japanese Patent Laid-Open Publication No. 2002-061641).

Normally, the bearing sleeve is fixed to an inner periphery of the housing, and the thrust member is fixed to the inner periphery at one end of the housing. Furthermore, in order to prevent the lubricating oil, which is filled into an internal space within the housing, from leaking out, a seal portion is often provided at the other end of the housing.

In the dynamic bearing device described above, press fitting is sometimes used as a means for fixing the thrust member to the inner periphery at one end of the housing. In addition, after press fitting the thrust member, an adhesive is sometimes filled into the press fitted portion from outside the housing, thereby sealing the press fitted portion with adhesive. However, accompanying the press fitting process, a predetermined region of the outer periphery of the housing undergoes expansion deformation outward, which might give rise to the following problems.

For example, when this kind of dynamic bearing device is used for the rotation support of any of the motors described above, the outer periphery of the housing is usually secured closely to the inner periphery of a bracket (a retaining member) with an adhesive, and the dimensions in an axial direction and the gap in which the adhesive is filled of the bonded portions of the two members are determined with due consideration to the adhesive strength that can be achieved. However, if during the press fitting of the thrust member, a portion of the bonding surface (securing surface) of the outer periphery of the housing undergoes expansion deformation, when securing the bearing device to the inner periphery of the retaining member, the gap in which the adhesive is filled becomes non-uniform in the axial direction, which leads to concerns over potential decreases in adhesive strength, and the potential occurrence of resonance problems.

Furthermore, securing the outer periphery of the housing closely to the inner periphery of the bracket (retaining member) via press fitting is another possibility, although in a similar manner to above, if during the press fitting of the thrust member, a portion of the press fitting surface (securing surface) of the outer periphery of the housing undergoes expansion deformation, when press fitting the bearing device to the inner periphery of the retaining member, the interference therebetween is non-uniform in an axial direction, which leads to concerns over potential decreases in the press fitting strength, and the potential occurrence of resonance problems.

Furthermore, when press fitting is employed as a means for securing the thrust member, the following problems might arise.

Namely, each of the structural components of the dynamic bearing device is cleaned following manufacture to remove any fine metallic particles such as cutting leavings generated during processing of the component, however, during press fitting of the thrust member, fine metallic particles such as abrasion particles (hereafter referred to as "abrasion particles") might be generated due to the sliding friction between the outer peripheral portion of the thrust member and the inner peripheral portion at one end of the housing to penetrate into the housing. Any abrasion particles penetrating into the housing will invade the bearing portion among the lubricating oil to exercise an unfavorable influence on the performance or the life of the bearing.

Furthermore, in the dynamic bearing device as described above, an adhesive is often used as a means for fixing the bearing sleeve to the housing. In such cases, for example, an adhesive is applied, in advance, to the inner peripheral surface of the housing, and the bearing sleeve is then inserted inside the housing and positioned at a predetermined location, thereafter, the adhesive is hardened. However, depending on the quantity of adhesive that is applied, during the insertion of the bearing sleeve inside the housing and the movement of the bearing sleeve to the predetermined location, excess adhesive may go round to the front of the bearing sleeve as it moves to exercise an unfavorable influence on the positioning of the bearing sleeve or the performance of the bearing.

For example, in the dynamic bearing device disclosed in Japanese Patent Laid-Open Publication No. 2002-061641, positioning of the bearing sleeve relative to the housing is achieved by contacting one end surface of the bearing sleeve with the inside surface of a seal portion (collar portion) provided at one end of the housing, however, if the go round of the excess adhesive takes place, when the bearing sleeve is moved to its final position, the adhesive will be trapped between the one end surface of the bearing sleeve and the inside surface of the seal portion, so that the precise positioning of the bearing sleeve relative to the housing may not be achieved.

Furthermore, the applicant of the present application has already filed an application (Japanese Patent Application No. 2002-117297) relating to a dynamic bearing device wherein longitudinal grooves are formed in the outer peripheral surface of the bearing sleeve, and lateral grooves that connect the longitudinal grooves with the inner peripheral surface of the bearing sleeve are formed in the end surface at one end of the bearing sleeve, thereby forming a circulation channel for a lubricating oil filled in an internal space within the housing. In this dynamic bearing device, however, the go round of the excess adhesive may cause the lateral grooves to be blocked with adhesive.

BRIEF SUMMARY OF THE INVENTION

An object of the present invention is to solve the problems described above due to the expansion deformation of the securing surface of the outer periphery of the housing, ensuring stabilization of the secured state between the housing and the retaining member, and enabling a desired level of securing strength to be achieved.

Another object of the present invention is to prevent the penetration of the abrasion particles described above.

Yet another object of the present invention is to prevent the go round of the excess adhesive, thereby avoiding the influences due to the go round of the excess adhesive.

In order to achieve the above objects, the present invention provides a dynamic bearing device comprising a housing, a bearing sleeve secured to an inner periphery of the housing, an axial member with an axial portion and a flange portion, a thrust member secured to one end of the housing, a radial bearing portion, which is provided between the bearing sleeve and the axial portion, and supports the axial portion in a non-contact manner in a radial direction by a dynamic pressure action of a lubricating oil that is generated in a radial bearing gap, and a thrust bearing portion, which is provided between the bearing sleeve and the thrust member and the flange portion, and supports the flange portion in a non-contact manner in a thrust direction by a dynamic pressure action of the lubricating oil that is generated in a thrust bearing gap, wherein the thrust member is press fitted inside an inner periphery of a press fitting portion provided at the one end of the housing with a predetermined interference, an outer periphery of the housing has a securing surface, which has a predetermined length in an axial direction and is secured closely to an inner periphery of a retaining member, and the securing surface has a deformation region that deforms radially outward by a predetermined quantity during press fitting of the thrust member, and with the thrust member in a press fitted state, the securing surface adopts a substantially straight shape in the axial direction, along an entire axial length of the securing surface.

In this description the expression "substantially straight shape in the axial direction" refers not only to the shape in which the securing surface is of the same diameter along the entire axial length thereof (a perfectly straight shape), but also shapes in which either all, or a portion of the deformation region of the securing surface has a difference in radius with respect to an other region than the deformation region that falls within a range from $-30\,\mu m$ to $+5\,\mu m$, for example (an approximately straight shape).

According to this configuration, when the thrust member is in a press fitted state inside the press fitting portion of the housing, the securing surface of the housing adopts a substantially straight shape in the axial direction, along the entire axial length of the surface, so that when the securing surface is secured closely to the inner periphery of the retaining member, the secured state is stable, and a desired level of securing strength can be obtained.

Furthermore, in order to achieve the objects described above, the present invention also provides a method of producing a dynamic bearing device comprising a housing, a bearing sleeve secured to an inner periphery of the housing, an axial member with an axial portion and a flange portion, a thrust member secured to one end of the housing, a radial bearing portion, which is provided between the bearing sleeve and the axial portion, and supports the axial portion in a non-contact manner in a radial direction by a dynamic pressure action of a lubricating oil that is generated in a radial bearing gap, and a thrust bearing portion, which is provided between the bearing sleeve and the thrust member and the flange portion, and supports the flange portion in a non-contact manner in a thrust direction by a dynamic pressure action of the lubricating oil that is generated in a thrust bearing gap, the method comprising the steps of forming a press fitting portion, into which the thrust member is press fitted with a predetermined interference, at the one end of the housing, forming a securing surface, which has a predetermined length in an axial direction and is secured closely to an inner periphery of a retaining member, on an outer periphery of the housing, receding a deformation region of the securing surface, which deforms radially outward by a predetermined quantity during press fitting of the thrust member, radially inward relative to the other region of the securing surface, by an amount equivalent to an amount of the outward deformation thereof, and press fitting and securing the thrust member inside an inner periphery of the press fitting portion of the housing.

By receding the deformation region of the securing surface of the housing radially inward relative to the other region of the securing surface, by an amount equivalent to the amount of the outward deformation thereof during press fitting of the thrust member, when the thrust member is in a press fitted state, the securing surface of the housing adopts a substantially straight shape in the axial direction, along the entire axial length thereof, so that when the securing surface is secured closely to the inner periphery of the retaining member, the secured state is stable, and a desired level of securing strength can be obtained.

According to the configurations above, as a means for securing the securing surface of the outer periphery of the housing to the inner periphery of the retaining member, securing by adhesive, securing by press fitting, or securing by some other suitable means may be employed. Furthermore, the deformation region of the securing surface of the housing may be provided adjacent to another end of the press fitting portion of the housing, and moreover the deformation region may be formed as a taper shape that gradually reduces in diameter toward the one end of the housing.

Furthermore, in order to achieve the objects described above, the present invention also provides a dynamic bearing device comprising a housing, a bearing sleeve secured to an inner periphery of the housing, an axial member with an axial portion and a flange portion, a thrust member secured to the inner peripheral portion at one end of the housing, a radial bearing portion, which is provided between the bearing sleeve and the axial portion, and supports the axial portion in a non-contact manner in a radial direction by a dynamic pressure action of a lubricating oil that is generated in a radial bearing gap, and a thrust bearing portion, which is provided between the bearing sleeve and the thrust member and the flange portion, and supports the flange portion in a non-contact manner in a thrust direction by a dynamic pressure action of the lubricating oil that is generated in a thrust bearing gap, wherein the thrust member is press fitted and secured to the inner peripheral portion at the one end of the housing with an adhesive disposed therebetween.

According to this configuration, even if abrasion particles are generated during press fitting of the thrust member, the abrasion particles are trapped by the adhesive to be sealed in the adhesive when the adhesive hardens. As a result, any penetration of the abrasion particles accompanying the press fitting of the thrust member can be prevented. Furthermore, during the press fitting of the thrust member, the adhesive also functions as a lubricant, which means that not only is the generation of the abrasion particle during press fitting suppressed, but the press fitting operation also becomes easier.

When the thrust member undergoes press fitting, a phenomenon occurs in which the adhesive goes round to the front of the thrust member in the direction of press fitting. If the go round of the adhesive is remarkable, the adhesive may reach as far as the vicinity around the axial member to obstruct the smooth rotation of the axial member. In order to avoid such an occurrence, an internal taper shaped space for retaining the adhesive is preferably provided between the outer peripheral portion of the thrust member and the inner peripheral portion at one end of the housing, adjacent to the press fitting portion of the thrust member. The adhesive that goes round to the front of the thrust member in the direction of press fitting is retained within the press fitting portion by capillary action of the internal taper shaped space, thereby preventing the adhesive flowing down to the axial member. Furthermore, as a result of improving the retention effect on the adhesive, the trapping and sealing effects on the abrasion particles by the adhesive are also enhanced.

The internal taper shaped space may be formed by providing a tapered surface on at least one of the outer peripheral portion of the thrust member and the inner peripheral portion at one end of the housing. Providing the tapered surface on the outer peripheral portion of the thrust member is preferred.

In addition to the internal taper shaped space described above, an external taper shaped space may also be provided between the outer peripheral portion of the thrust member and the inner peripheral portion at one end of the housing, for retaining the adhesive, adjacent to the press fitting portion of the thrust member outside the housing. Following press fitting of the thrust member, the press fitted portion can be sealed with the adhesive retained by the capillary action of the external taper shaped space. If a step portion is provided in the inner peripheral portion at one end of the housing, positioned within the external taper shaped space, and facing toward the outside of the housing, then the quantity of adhesive retained within the external taper shaped space following press fitting of the thrust member increases, enabling the sealing effect on the press fitting portion to be further improved.

The external taper shaped space may be formed by providing a tapered surface on at least one of the outer peripheral portion of the thrust member and the inner peripheral portion at one end of the housing. Providing the tapered surface on the outer peripheral portion of the thrust member is preferred.

Furthermore, in order to achieve the objects described above, the present invention also provides a method of producing a dynamic bearing mentioned above, comprising the steps of applying an adhesive to an inner peripheral portion at one end of the housing, and press fitting a thrust member into the inner peripheral portion at the end of the housing to which the adhesive has been applied.

Furthermore, in order to achieve the objects described above, the present invention also provides a dynamic bearing device comprising a housing, a bearing sleeve secured to an inner peripheral surface of the housing with an adhesive, an axial member, and a radial bearing portion, which is provided between the bearing sleeve and the axial member, and supports the axial member in a non-contact manner in a radial direction by a dynamic pressure action of a lubricating oil that is generated in a radial bearing gap, wherein a concave adhesive reservoir is provided between an inner peripheral surface of the housing and an outer peripheral surface of the bearing sleeve.

According to this configuration, even if excess adhesive arises due to excessive adhesive application, the excess adhesive is captured within the concave adhesive reservoir, so that the go round of the adhesive exercising an unfavorable influence on the positioning of the bearing sleeve or the performance of the bearing can be prevented.

The adhesive reservoir may be formed in either the inner peripheral surface of the housing or the outer peripheral surface of the bearing sleeve. Alternatively, opposing concave portions may be formed in corresponding positions in both the inner peripheral surface of the housing and the outer peripheral surface of the bearing sleeve, with the concave space formed by the two portions serving as the adhesive reservoir. Forming the adhesive reservoir in the inner peripheral surface of the housing is preferred. Adhesive reservoirs may also be provided at a plurality of locations.

There are no particular restrictions on the shape of the adhesive reservoir, although a shape which gradually narrows in both axial directions is preferred. When the bearing sleeve is inserted inside the inner peripheral surface of the housing, the adhesive reservoir may sometimes capture a quantity of adhesive greater than the actual excess adhesive. However even in this case, in the time period between completion of the positioning of the bearing sleeve and hardening of the adhesive, any excess adhesive captured within the adhesive reservoir flows in both axial directions toward the narrower portions of the reservoir under capillary action, and fills the targeted securing region (the space between the outer peripheral surface of the bearing sleeve and the inner peripheral surface of the housing). As a result, problems of either excessive or insufficient adhesive within the securing region can be avoided, enabling a stable securing state to be achieved.

In addition, the present invention also provides a dynamic bearing device comprising a housing, a bearing sleeve secured to an inner peripheral surface of the housing, an axial member with an axial portion and a flange portion, a seal portion provided at one end of the housing, a thrust portion provided at the other end of the housing, a radial bearing portion, which is provided between the bearing sleeve and the axial portion, and supports the axial portion in a non-contact manner in a radial direction by a dynamic pressure action of a lubricating oil that is generated in a radial bearing gap, and a thrust bearing portion, which is provided between the bearing sleeve and the thrust portion and the flange portion, and supports the flange portion in a non-contact manner in a thrust direction by a dynamic pressure action of the lubricating oil that is generated in a thrust bearing gap, wherein a lubricating oil is filled in the internal space within the housing, and wherein an inside surface of the seal portion, at an inner diameter side region thereof, partially contacts with an inner diameter side region of an end surface at one end of the bearing sleeve, and at an outer diameter side region thereof, recedes from the end surface at the one end of the bearing sleeve to form a recessed portion.

According to this configuration, the lubricating oil filled in the internal space within the housing is able to circulate within the internal space, and as a result, the phenomenon wherein the pressure of the lubricating oil in the internal space is negative in localized areas can be prevented, enabling the solution of associated problems such as the generation of air bubbles accompanying the negative pressure generation, and the leakage of the lubricating oil or vibration arising from such air bubble generation.

Furthermore, in those cases where the bearing sleeve is secured to the inner peripheral surface of the housing with an adhesive, even if the go round of the adhesive occurs, since the recessed portion with the required capacity is provided between the outer diameter side region of the inside surface of the seal and the end surface at the end of the bearing sleeve, the adhesive is less likely to flow in the direction of the radial grooves. As a result, the situation in which the radial grooves become blocked with adhesive can be effectively avoided.

BRIEF DESCRIPTION OF THE DRAWINGS

FIG. 7 and FIG. 8 show a case in which a thrust member is press fitted inside the inner peripheral portion at the lower end of a housing with an adhesive disposed therebetween, wherein FIG. 7 is a partially enlarged sectional view showing the state following application of the adhesive to the inner peripheral portion at the lower end of the housing, and FIG. 8 is a partially enlarged sectional view showing the state following press fitting of the thrust member inside the inner periphery at the lower end of the housing.

DETAILED DESCRIPTION OF THE INVENTION

As follows is a description of embodiments of the present invention.

Figure 1:
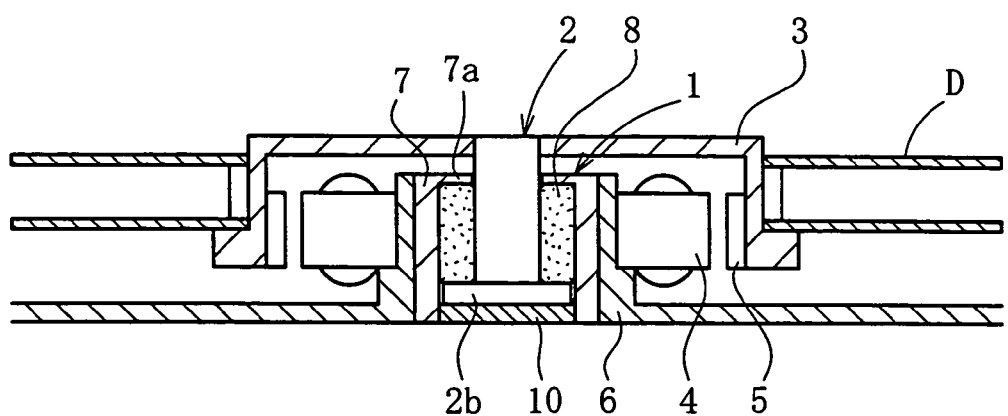
FIG. 1 is a cross-sectional view of a spindle motor for information-processing equipment that uses a dynamic bearing device according to the present invention.

FIG. 1 shows one example of the construction of a spindle motor for information-processing equipment that incorporates a dynamic bearing device 1 according to the present embodiment. This spindle motor is used in a disk drive device such as HDD, and comprises a disk hub 3 serves as a rotor, a dynamic bearing device 1 for supporting the rotation of the disk hub 3, a bracket 6 serve as a retaining member for retaining the dynamic bearing device 1, and a stator 4 and a rotor magnet 5, which are provided between the disk hub 3 and the bracket 6, and oppose each other through a predetermined gap provided therebetween. In this embodiment, the disk hub 3 is mounted to an axial member 2 of the dynamic bearing device 1. The stator 4 is attached to the outer periphery of the bracket 6, the rotor magnet 5 is attached to the inner periphery of the disk hub 3, and the stator 4 and the rotor magnet 5 oppose each other through the gap in the radial direction. A housing 7 for the dynamic bearing device 1 is secured to the inner periphery of the bracket 6 with an adhesive, for example. One or a plurality of disks D such as magnetic disks are held by the disk hub 3. When the stator 4 is turned on electricity, the rotor magnet 5 and the stator 4 are in corporation with each other to generate a rotating magnetic field, thereby the disk hub 3 and the axial member 2 rotate together.

Figure 2:
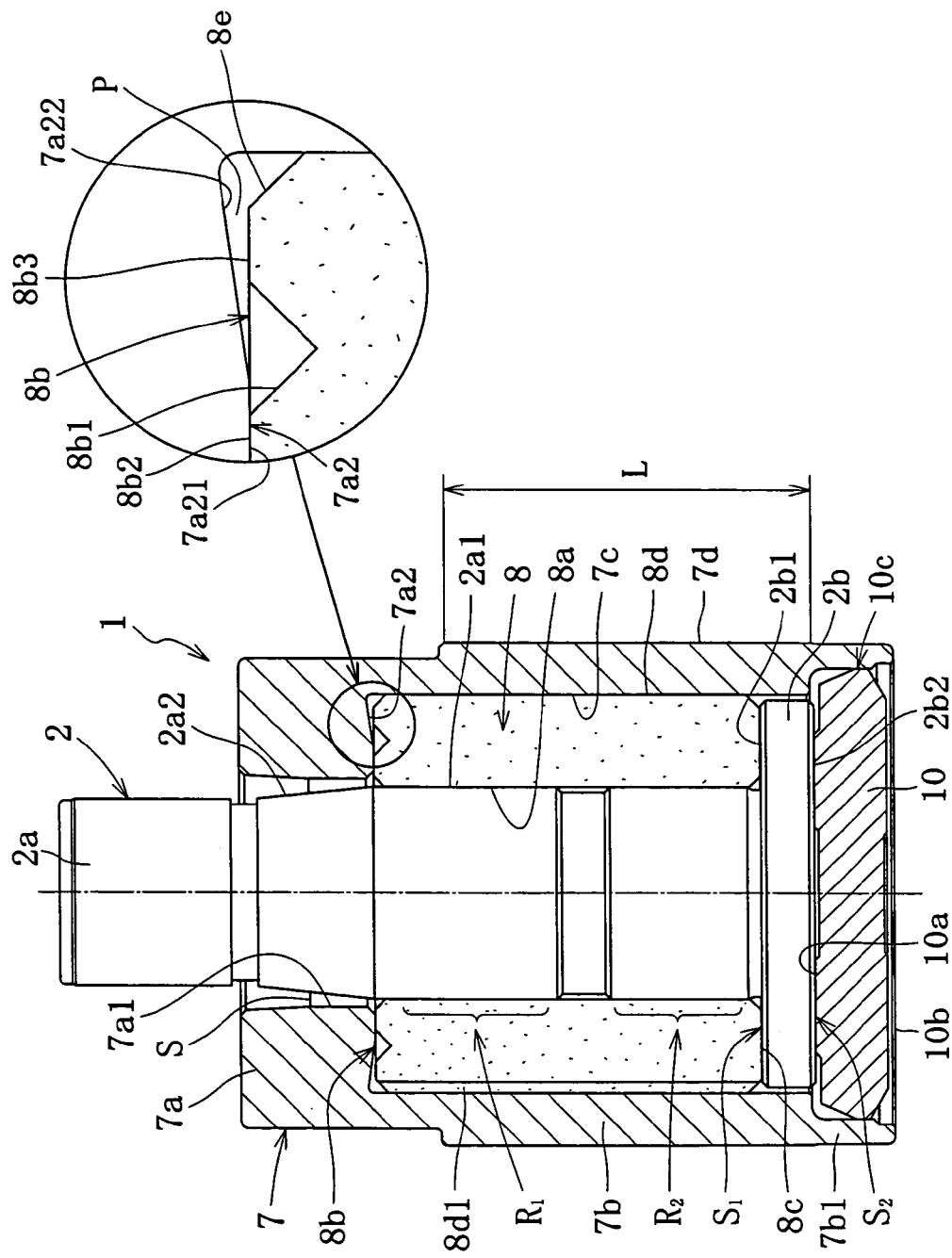
FIG. 2 is a cross-sectional view of a dynamic bearing device according to an embodiment of the present invention.

FIG. 2 shows the dynamic bearing device 1. This dynamic bearing device 1 comprises the housing 7, a bearing sleeve 8 and a thrust member 10 that are secured to the housing 7, and the axial member 2 as structural components.

A first radial bearing portion R1 and a second radial bearing portion R2 are provided between an inner peripheral surface 8a of the bearing sleeve 8 and an outer peripheral surface 2a1 of an axial portion 2a of the axial member 2, as separated from each other along the axial direction. Furthermore, a first thrust bearing portion S1 is provided between a lower end surface 8c of the bearing sleeve 8 and an upper end surface 2b1 of a flange portion 2b of the axial member 2, and a second thrust bearing portion S2 is provided between an upper end surface 10a of the thrust member 10 and the lower end surface 2b2 of the flange portion 2b. For ease of description, the side of the thrust member 10 is termed the lower side, and the opposite side to the thrust member 10 is termed the upper side.

The housing 7 is formed, for example, from a soft metal material such as brass or a resin material such as a thermoplastic resin, and comprises a cylindrical side portion 7b, and an annular seal portion 7a extending radially integrally inward from the upper end of the side portion 7b. An inner peripheral surface 7a1 of the seal portion 7a opposes a tapered surface 2a2 provided on the outer periphery of the axial portion 2a through a predetermined sealing space S. Furthermore, a press fitting portion 7b1, into which the thrust member 10 is press fitted, is formed at the lower end of the side portion 7b. The inner periphery of the press fitting portion 7b1 is of a large diameter than an inner peripheral surface 7c inside which the bearing sleeve 8 is secured, and the wall thickness of the press fitting portion 7b1 is thinner than that of the main portion of the side portion 7b. Furthermore, a securing surface 7d with a predetermined length L in the axial direction is formed on the outer periphery of the housing 7.

Figure 6:
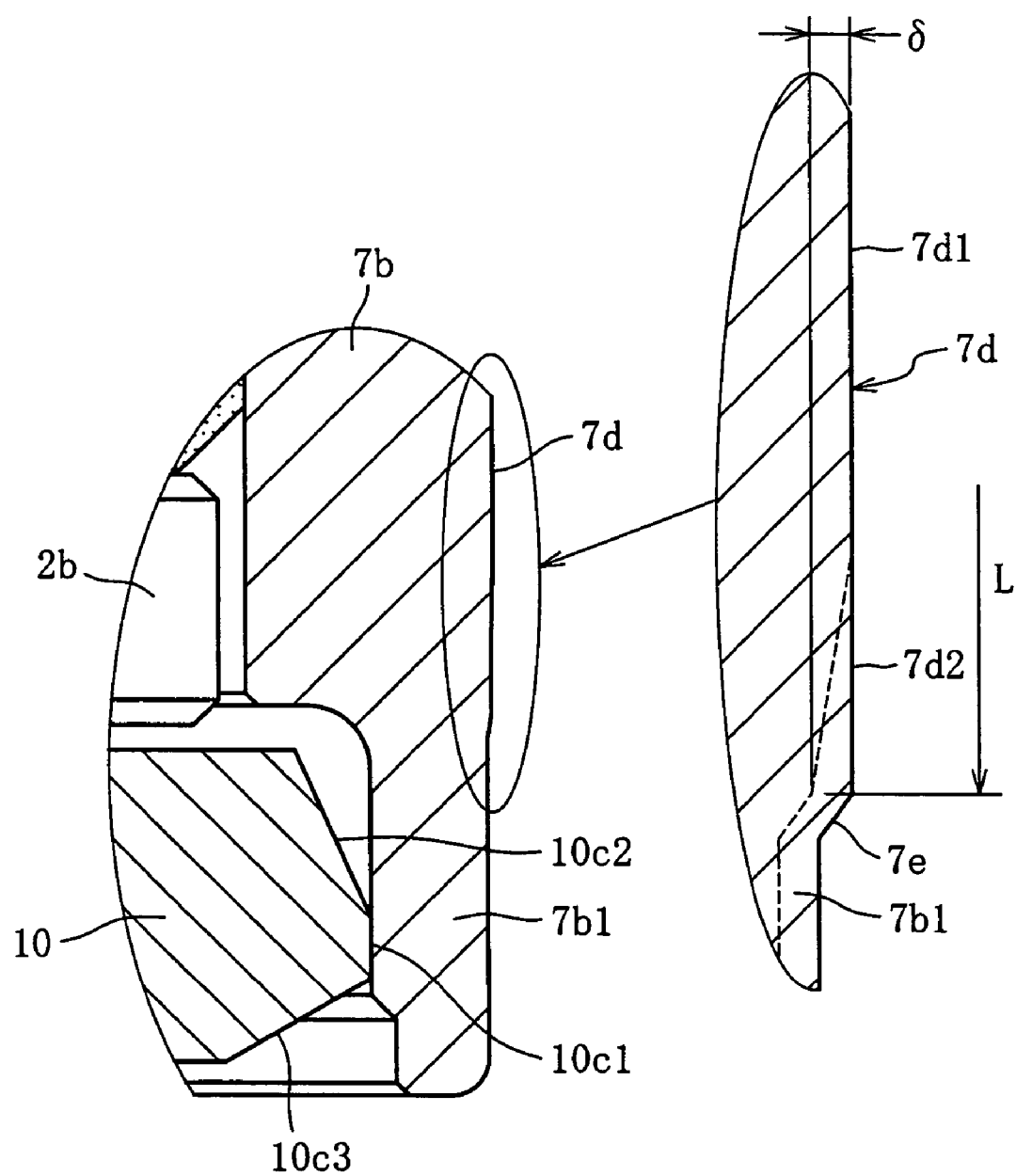
FIG. 6 is a partially enlarged sectional view showing the vicinity of the press fitting portion of the housing, and the vicinity of the deformation region of the securing surface (following press fitting of the thrust member)

As shown in the enlarged view of FIG. 6, the securing surface 7d is positioned above the press fitting portion 7b1, and is connected to the outer periphery of the press fitting portion via a step portion 7e. Furthermore, the securing surface 7d is substantially straight along the entire axial region L thereof.

Figure 5:
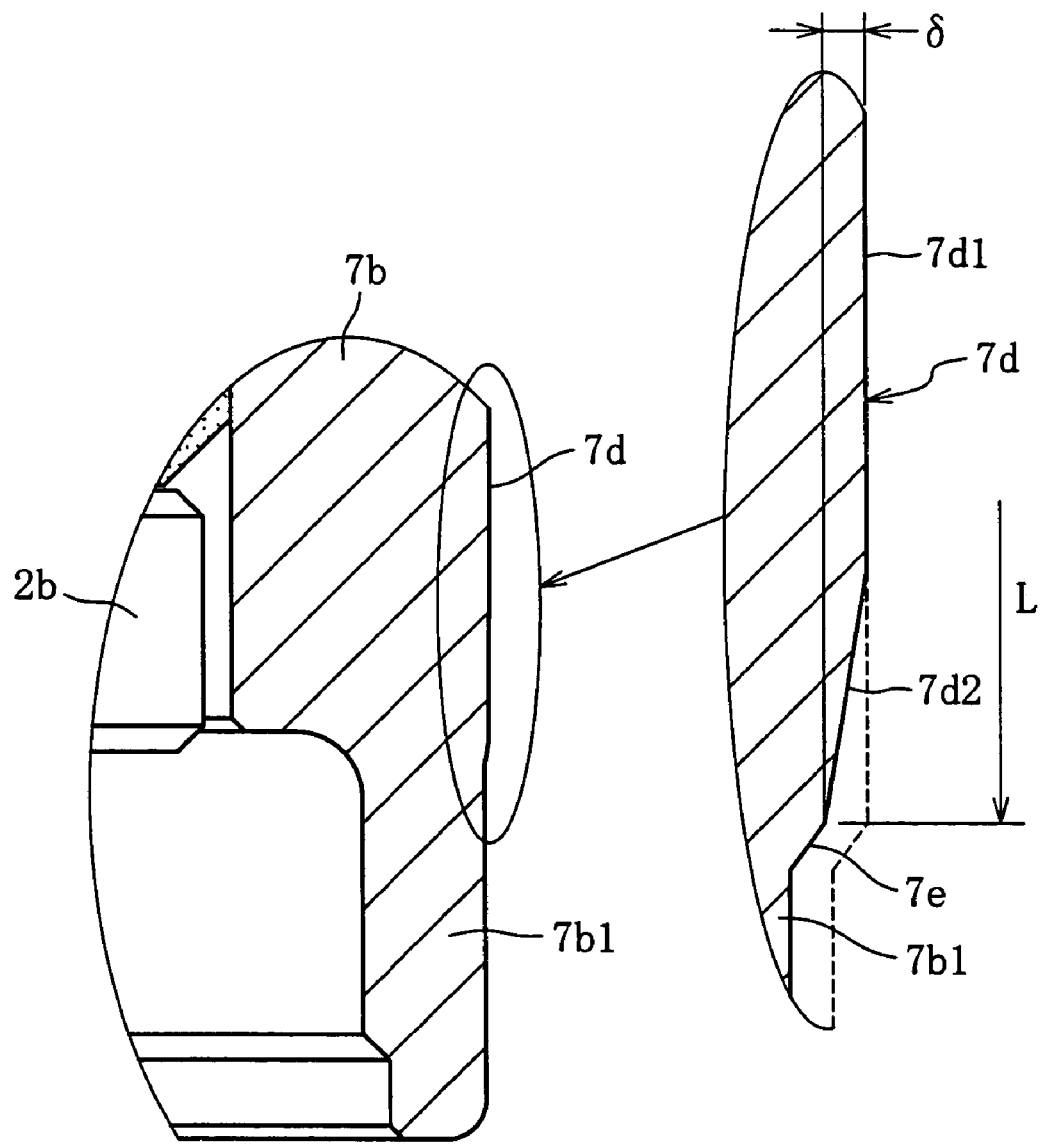
FIG. 5 is a partially enlarged sectional view showing the vicinity of a press fitting portion of a housing, and the vicinity of a deformation region of a securing surface (prior to press fitting of the thrust member).

FIG. 5 shows the state prior to press fitting of the thrust member 10 into the press fitting portion 7b1. The securing surface 7d comprises a deformation region 7d2, which deforms radially outward by a predetermined amount when the thrust member 10 undergoes press fitting, and an other region 7d1 (a region that undergoes no expansion deformation during press fitting of the thrust member 10). In this embodiment, the deformation region 7d2 has a tapered shape gradually reduced in diameter toward the downward direction, and is connected to the outer periphery of the press fitting portion 7b1 via the step portion 7e. Furthermore, the deformation region 7d2 is receded radially inward relative to the other region 7d1, by an amount equivalent to the amount of the outward deformation thereof during press fitting of the thrust member 10. The dotted line shown in the enlarged view at the right of FIG. 5 represents the position of the deformation region 7d2 following deformation, and the maximum recession quantity of the deformation region 7d2 is equal to the maximum deformation quantity (the value in the radial direction) δ. Typically, since the maximum deformation quantity 6 of the deformation region 7d2 is either equal to, or very similar to, the interference required (the value in the radial direction) of the thrust member 10 during press fitting, the maximum recession quantity of the deformation region 7d2 may be designed to be equal to the interference (the value in the radial direction) of the thrust member 10 during press fitting.

The axial member 2 is formed, for example, from a metal material such as stainless steel, and comprises the axial portion 2a, and the flange portion 2b provided at the lower end of the axial portion 2a integrally or separately. The tapered surface 2a2 of the axial portion 2a is gradually reduced in diameter upward (toward the exterior of the housing 7), and serves as a centrifugal seal under rotation of the axial member 2.

The bearing sleeve 8 is formed, for example, in a cylindrical shape, from a porous body formed from a sintered metal, and particularly from a sintered metal porous body containing copper as a primary component. The bearing sleeve 8 is secured to a predetermined position on the inner peripheral surface of the housing 7.

Figure 3A:
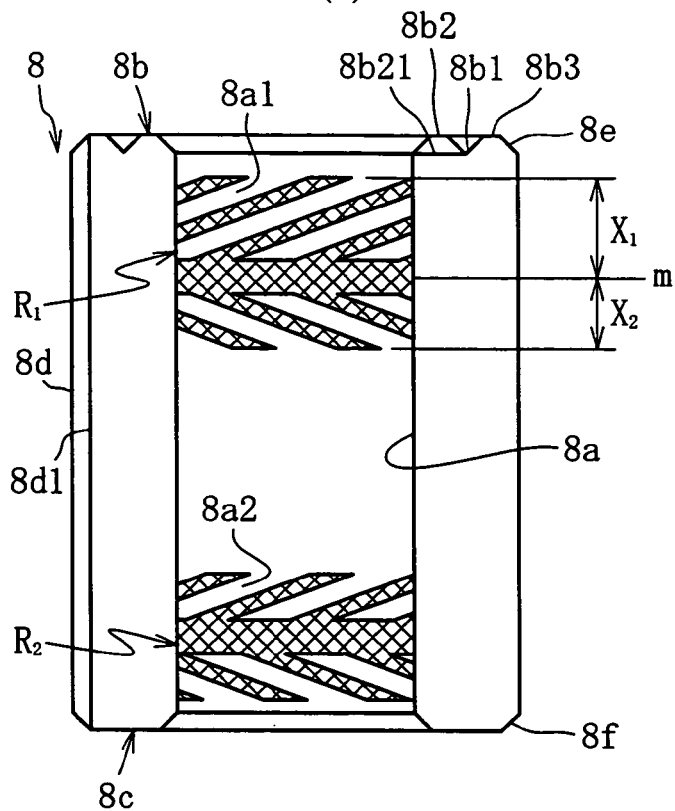
FIG. 3(a) is a cross-sectional view of a bearing sleeve.

Two upper-lower regions, which serve radial bearing surfaces of the first radial bearing portion R1 and the second radial bearing portion R2, are provided on the inner peripheral surface 8a of the bearing sleeve 8 formed from the sintered metal, and dynamic pressure generating grooves 8a1, 8a2, such as the herringbone shapes shown in FIG. 3(a), are formed within these two regions. The upper dynamic pressure generating grooves 8a1 are formed asymmetrically in the axial direction relative to the axial center m (the center in an axial direction between the upper and lower inclined grooves), so that with respect to the axial center m, the axial dimension X1 of the upper region is greater than the axial dimension X2 of the lower region. Furthermore, either one, or a plurality of axial grooves 8d1 are formed in the outer peripheral surface 8d of the bearing sleeve 8, along the entire axial length thereof. In this example, three axial grooves 8d1 are formed at equal intervals around the sleeve circumference. Furthermore, chamfers 8e, 8f are formed at the outer peripheral corners on both the upper end surface 8b and the lower end surface 8c respectively.

Figure 3B:
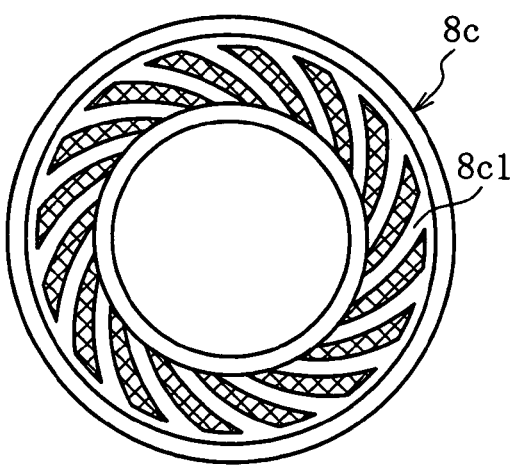
FIG. 3(b) is a diagram showing the lower end surface of the bearing sleeve.

On the lower end surface 8c of the bearing sleeve 8, which serves as the thrust bearing surface of the first thrust bearing portion S1, are formed with dynamic pressure generating grooves 8c1, such as the spiral shapes shown in FIG. 3(b). In addition, a herringbone shape or radiation groove shape or the like may be employed as the shape of the dynamic pressure generating grooves.

Figure 3C:
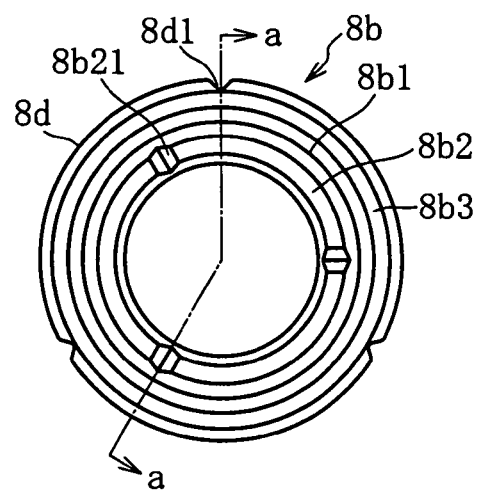
FIG. 3(c) is a diagram showing the upper end surface of the bearing sleeve.

As shown in FIG. 3(c), the upper end surface 8b of the bearing sleeve 8 is partitioned into an inner diameter side region 8b2 and an outer diameter side region 8b3 by a circular groove 8b1 with a V shaped cross-section provided at an approximate midpoint in the radial direction, and either one, or a plurality of radial grooves 8b21 are formed in the inner diameter side region 8b2. In this example, three radial grooves 8b21 are formed at equal intervals around the circumference.

As shown in the enlarged view within the circle of FIG. 2, an inner diameter side region 7a21 of an inside surface 7a2 of the seal portion 7a partially contacts with the inner diameter side region 8b2 of the upper end surface 8b of the bearing sleeve 8, whereas an outer diameter side region 7a22 of the inside surface 7a2 is formed as either an incline or a curve so as to be receded from the upper end surface 8b of the bearing sleeve 8. As a result, a recessed portion P of a required capacity is formed between the outer diameter side region 7a22 of the inside surface 7a2 and the upper end surface 8b (including the chamfer 8e). The inner diameter side of the recessed portion P interconnects with the circular groove 8b1, and the outer diameter side interconnects with the axial grooves 8d1.

Figure 4A:
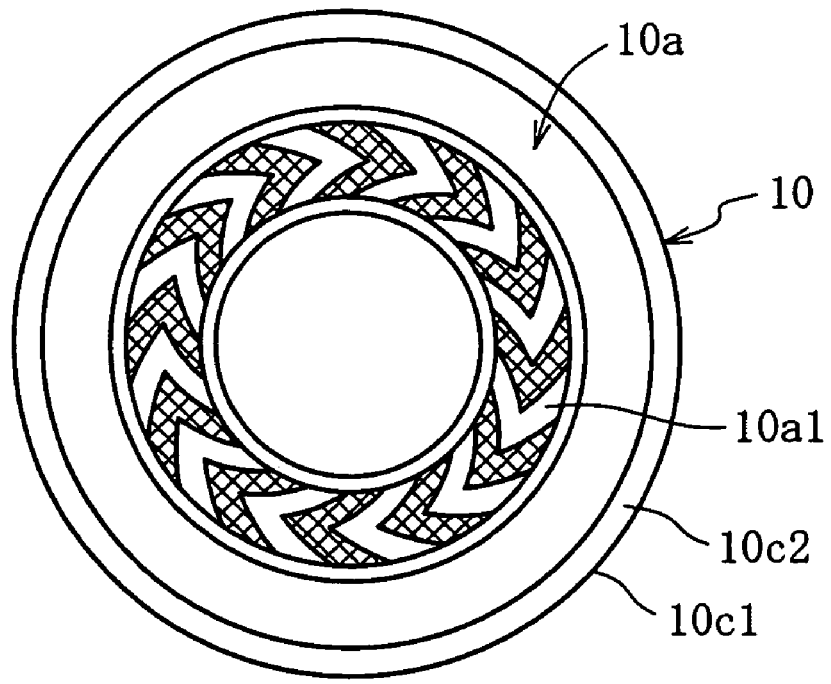
FIG. 4 is a diagram showing the upper end surface of a thrust member.
FIG. 4(b) is a cross-sectional view of the thrust member.
Figure 4B:
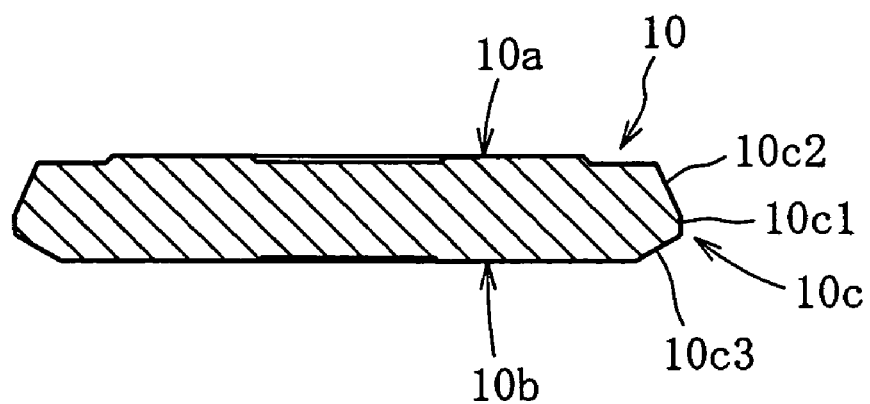

The thrust member 10 is formed, for example, from a metal material such as brass, and is press fitted and secured inside the inner periphery of the press fitting portion 7b1 of the housing 7. As shown in FIG. 4, on the upper end surface 10a of the thrust member 10, which serves as the thrust bearing surface of the second thrust bearing portion S2, are formed, for example, with herringbone shaped dynamic pressure generating grooves 10a1. In addition, a spiral shape or radiation groove shape or the like may be employed as the shape of the dynamic pressure generating grooves.

An outer peripheral portion 10c of the thrust member 10 comprises a press fitting surface 10c1 that is press fitted inside the inner periphery of the press fitting portion 7b1 of the housing 7, a tapered surface 10c2 that extends from the upper edge of the press fitting surface 10c1 along an inwardly directed incline to the upper end surface 10a, and a tapered surface 10c3 that extends from the lower edge of the press fitting surface 10c1 along an inwardly directed incline to the lower end surface 10b. The press fitting surface 10c1 is parallel to the axial direction.

The dynamic bearing device 1 of the present embodiment is assembled through steps as the following.

First, the bearing sleeve 8 is inserted into the inner peripheral surface 7c of the housing 7, until the upper end surface 8b thereof contacts with the inside surface 7a2 of the seal portion 7a. Thereby, the bearing sleeve 8 is positioned with respect to the housing 7. The securing of the bearing sleeve 8 to the inner peripheral surface 7c of the housing 7 may be achieved by press fitting, adhesive bonding, a combination of press fitting and adhesive bonding, or some other suitable securing means.

Next, the axial member 2 is inserted in the bearing sleeve 8. By measuring the inner diameter dimension of the bearing sleeve 8 following securing within the housing 7, and then dimension matching with the outer diameter dimension (which has been measured in advance) of the axial portion 2a, the radial bearing gap can be set with a high level of precision.

Subsequently, the thrust member 10 is press fitted the inner periphery of the press fitting portion 7b1 of the housing 7 until a predetermined position to be secured therein.

Because the deformation region 7d2 of the securing surface 7d of the housing 7 is receded radially inward relative to the other region 7d1, by an amount equivalent to the amount of the outward deformation thereof generated during press fitting of the thrust member 10 (see FIG. 5), when the thrust member 10 is press fitted, the securing surface 7d of the housing 7 adopts a substantially straight shape in the axial direction, along the entire axial region L (see FIG. 6). Consequently when the securing surface 7d of the housing 7 is secured to the inner periphery of the bracket 6, the secured state is stable, and a desired level of securing strength can be obtained.

Upon completion of the assembly, the axial portion 2a of the axial member 2 is inserted within the inner peripheral surface 8a of the bearing sleeve 8, and the flange portion 2b is accommodated within the space between the lower end surface 8c of the bearing sleeve 8 and the upper end surface 10a of the thrust member 10. Subsequently, the internal space within the housing 7, which is sealed by the seal portion 7a, including the pores in the bearing sleeve 8, are filled with the lubricating oil. The surface of the lubricating oil is maintained within the sealing space S.

During rotation of the axial member 2, the regions (the upper and lower regions) that serves as the radial bearing surfaces of the inner peripheral surface 8a of the bearing sleeve 8 each oppose the outer peripheral surface 2a1 of the axial portion 2a through a radial bearing gap. Furthermore, the region that serves as the thrust bearing surface of the lower end surface 8c of the bearing sleeve 8 opposes the upper end surface 2b1 of the flange portion 2b through a thrust bearing gap, and the region that serves as the thrust bearing surface of the upper end surface 10a of the thrust member 10 opposes the lower end surface 2b2 of the flange portion 2b through a thrust bearing gap. When the axial member 2 rotates, dynamic pressure of the lubricating oil is generated within the radial bearing gaps, so that the axial portion 2a of the axial member 2 is rotatably supported in a non-contact manner in the radial direction by oil film of the lubricating oil formed in the radial bearing gaps. Accordingly, the first radial bearing portion R1 and the second radial bearing portion R2 are formed, which rotatably support the axial member 2 in a non-contact manner in the radial direction. At the same time, dynamic pressure of the lubricating oil is generated within the thrust bearing gaps, so that the flange portion 2b of the axial member 2 is rotatably supported in a non-contact manner in the thrust directions by oil film of the lubricating oil formed within the above thrust bearing gaps. Accordingly, the first thrust bearing portion S1 and the second thrust bearing portion S2 are formed, which rotatably support the axial member 2 in a non-contact manner in the thrust directions.

As described above, the dynamic pressure generating grooves 8a1 of the first radial bearing portion R1 are formed asymmetrically in the axial direction relative to the axial center m, so that, with respect to the axial center m, the axial dimension X1 of the upper region is greater than the axial dimension X2 of the lower region (see FIG. 3(a)). As a result, during rotation of the axial member 2, the retractive force (pumping force) of the lubricating oil generated by the dynamic pressure generating grooves 8a1 is relatively greater in the upper region than the lower region. As a result of this retractive force pressure difference, the lubricating oil filled in the gap between the inner peripheral surface 8a of the bearing sleeve 8 and the outer peripheral surface 2a1 of the axial portion 2a flows downward, and follows a circulatory route through the thrust bearing gap of the first thrust bearing portion S1, the axial grooves 8d1, the recessed portion P, the circular groove 8b1, the radial grooves 8b21, and then back to the gap between the inner peripheral surface 8a of the bearing sleeve 8 and the outer peripheral surface 2a1 of the axial portion 2a, thereby flowing once again into the radial bearing gap of the first radial bearing portion R1. By employing a construction in which the lubricating oil circulates in this manner within the internal space within the housing 7, the phenomenon wherein the pressure of the lubricating oil in the internal space is negative in localized areas can be prevented, enabling the solution of associated problems such as the generation of air bubbles accompanying the negative pressure generation, and the leakage of the lubricating oil or vibration due to such air bubble generation. Furthermore, even if air bubbles become entrapped in the lubricating oil for some reason, the air bubbles are circulated with the lubricating oil, and are expelled externally through the surface (gas-liquid interface) of the lubricating oil within the sealing space S, enabling the problems associated with air bubbles to be even more effectively prevented.

Figure 7:
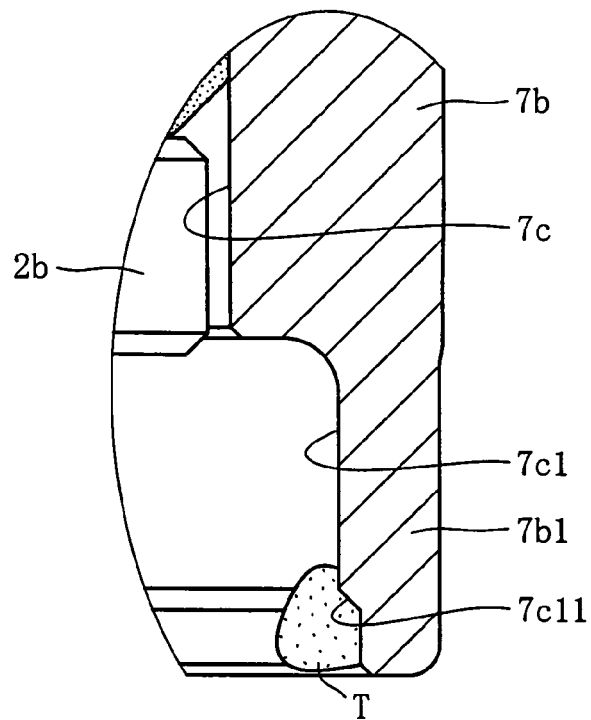

The thrust member 10 may also be press fitted and secured to the inner periphery of the press fitting portion 7b1 of the housing 7 under an adhesive disposed therebetween. Specifically, as shown in the enlarged view of FIG. 7, an adhesive T is applied to the lower end of an inner peripheral portion 7c1 of the press fitting portion 7b1, and the thrust member 10 is then press fitted into the inner peripheral portion 7c1 until a predetermined position. During the press fitting of the thrust member 10, the adhesive T also functions as a lubricant, which means that not only is the generation of abrasion particles during press fitting reduced, but the press fitting operation also becomes easier. A step portion 7c11 that faces toward the outside of the housing 7 is formed in the inner peripheral portion 7c1, and in this embodiment, the step portion 7c11 is a tapered surface that gradually increase in diameter downward.

Figure 8:
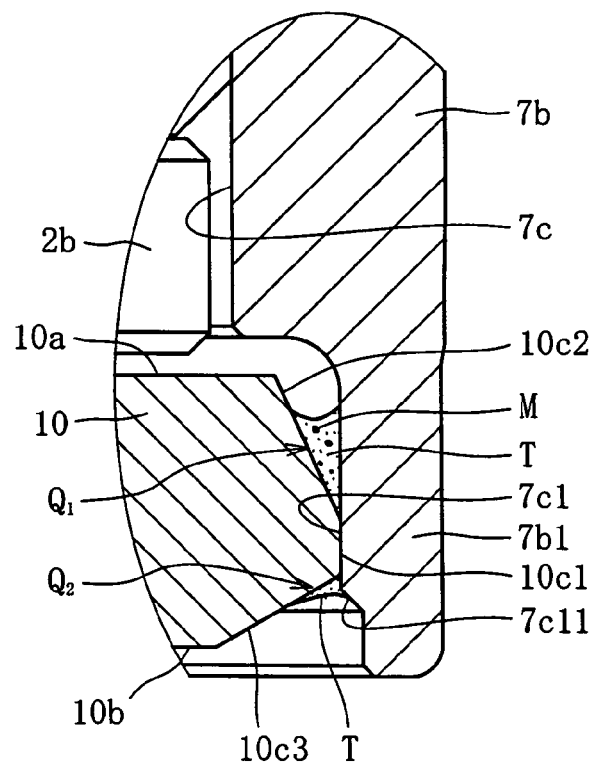

FIG. 8 shows the state following completion of the press fitting of the thrust member 10. The press fitting surface 10c1 of the outer peripheral portion 10c of the thrust member 10 has been press fitted, with a predetermined press-fitting allowance, into the inner peripheral portion 7c1 of the press fitting portion 7b1 of the housing 7. An internal taper shaped space Q1 is adjacent to the press fitted portion inside the housing 7, and an external taper shaped space Q2 is adjacent to the press fitted portion outside the housing 7. The internal taper shaped space Q1 is formed between the tapered surface 10c2 at the upper side of the outer peripheral portion 10c and the inner peripheral portion 7c1, and has a shape that gradually narrows toward the press fitted portion. The external taper shaped space Q2 is formed between the tapered surface 10c3 at the lower side of the outer peripheral portion 10c and the inner peripheral portion 7c1, and also has a shape that gradually narrows toward the press fitted portion.

When the thrust member 10 undergoes press fitting, the adhesive T that goes round to the front of the thrust member 10 in the press fitting direction, is retained by the capillary action of the internal taper shaped space Q1. The abrasion particles M generated during the press fitting of the thrust member 10 is trapped by the adhesive T within the internal taper shaped space Q1, and is then sealed in the adhesive T when the adhesive T hardens. As a result of the adhesive retention effect by the internal taper shaped space Q1, the flow of the adhesive T toward the axial member 2 is inhibited, and the trapping and sealing effects on the abrasion particles M by the adhesive T can be further enhanced.

Furthermore, the adhesive T is also retained by the capillary action of the external taper shaped space Q2, and the retained adhesive T seals the press fitted portion of the thrust member 10. If, as in this embodiment, a step portion 7c11 is provided in the inner peripheral portion 7c1 of the press fitting portion 7b1 of the housing 7, since the quantity of adhesive T that remains within the external taper shaped space Q2 following press fitting of the thrust member 10 is large, the sealing effect on the press fitted portion can be further enhanced.

Figure 9:
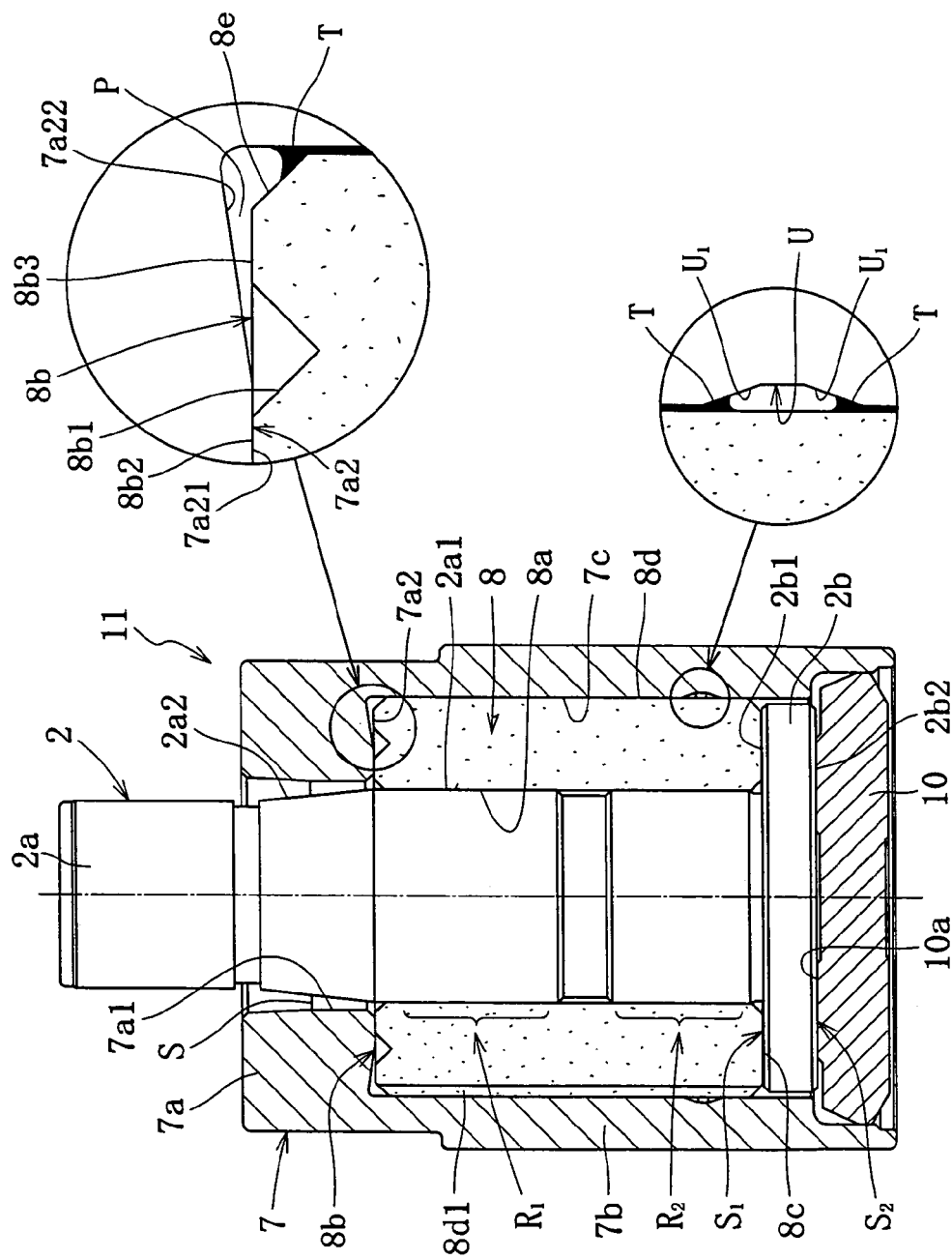
FIG. 9 is a cross-sectional view showing a dynamic bearing device according to another embodiment.

FIG. 9 shows a dynamic bearing device 11 according to another embodiment. In this embodiment, a concave shaped adhesive reservoir U is formed in the inner peripheral surface 7c of the housing 7. The adhesive reservoir U is formed, for example, in the shape of a circular groove around the inner peripheral surface 7c of the housing 7, the both side regions thereof in the axial direction are formed with tapered surfaces U1 respectively. Accordingly, the adhesive reservoir U gradually reduces in size in both axial directions.

To secure the bearing sleeve 8 within the housing 7, first a predetermined quantity of an adhesive is applied to the inner peripheral surface 7c of the housing 7. Then, the bearing sleeve 8 is inserted into the inner peripheral surface 7c of the housing 7, until the upper end surface 8b contacts with the inside surface 7a2 of the seal portion 7a. Thereby, the bearing sleeve 8 is positioned with respect to the housing 7. When the adhesive is hardened while maintaining this state, the bearing sleeve 8 can be secured in the desired position relative to the housing 7.

In this embodiment, because the adhesive reservoir U is provided in the inner peripheral surface 7c of the housing 7, even if excess adhesive T arises due to excessive application (see the enlarged view within the circle of FIG. 9), the excess adhesive T is captured within the concave shaped adhesive reservoir U, so that the go round of the adhesive T exercising an unfavorable influence on the positioning of the bearing sleeve 8 or the performance of the bearing can be prevented. Furthermore, because the tapered surfaces U1 cause the adhesive reservoir U to gradually reduce in size in both axial directions, in the time period between completion of the positioning of the bearing sleeve 8 and hardening of the adhesive T, any excess adhesive T captured within the adhesive reservoir U flows toward the both narrower axial direction side under capillary action to be filled into the targeted securing region (the space between the outer peripheral surface 8d of the bearing sleeve 8 and the inner peripheral surface 7c of the housing 7). As a result, problems of either excessive or insufficient adhesive within the securing region of the bearing sleeve 8 can be avoided, enabling a stable securing state to be achieved.

Furthermore, because a recessed portion P with the required capacity is provided between the outer diameter side region 7a22 of the inside surface 7a2 of the seal portion 7a, and the upper end surface 8b of the bearing sleeve 8 (including the chamfer 8e), even if the adhesive goes round, the adhesive T is less likely to flow toward the radial grooves 8b21. Particularly in the case of this embodiment, since a taper shaped space (formed between the inside surface 7a2 and the chamfer 8e) is provided at the outer diameter side of the recessed portion P, so that the adhesive T within the recessed portion P is attracted toward the aforementioned securing region (the gap between the outer peripheral surface 8d of the bearing sleeve 8 and the inner peripheral surface 7c of the housing 7) by a capillary action of the taper shaped space, the flow of the adhesive T toward the radial grooves 8b21 can be even more effectively prevented.

Accordingly, the situation in which these radial grooves 8b21 become blocked with the adhesive T can be effectively avoided.

The other technical matters are the same as those described above for the first embodiment, and so their description is omitted here.

What is claimed is:

1. A dynamic bearing device comprising a housing, a bearing sleeve secured to an inner periphery of the housing, an axial member with an axial portion and a flange portion, a thrust member secured to one end of the housing, a radial bearing portion, which is provided between the bearing sleeve and the axial portion, and supports the axial portion in a non-contact manner in a radial direction by a dynamic pressure action of a lubricating oil that is generated in a radial bearing gap, and a thrust bearing portion, which is provided between the bearing sleeve and the thrust member, and the flange portion, and supports the flange portion in a non-contact manner in a thrust direction by a dynamic pressure action of the lubricating oil that is generated in a thrust bearing gap, wherein the thrust member is press fitted inside an inner periphery of a press fitting portion provided at the one end of the housing, with a predetermined interference, an outer periphery of the housing has a securing surface, which has a predetermined length in an axial direction and is secured closely to an inner periphery of a retaining member, and the securing surface has a deformation region that deforms radially outward by a predetermined quantity during press fitting of the thrust member, and with the thrust member in a press fitted state, the securing surface adopts a substantially straight shape in the axial direction, along an entire axial length of the securing surface.

2. A dynamic bearing device according to claim 1, wherein the deformation region of the securing surface is adjacent to another end of the press fitting portion of the housing.

3. A dynamic bearing device according to claim 1, wherein prior to press fitting of the thrust member, the deformation region of the securing surface comprises a tapered shape that gradually reduces in diameter toward the one end of the housing.

4. A method of producing a dynamic bearing device comprising a housing, a bearing sleeve secured to an inner periphery of the housing, an axial member with an axial portion and a flange portion, a thrust member secured to one end of the housing, a radial bearing portion, which is provided between the bearing sleeve and the axial portion, and supports the axial portion in a non-contact manner in a radial direction by a dynamic pressure action of a lubricating oil that is generated in a radial bearing gap, and a thrust bearing portion, which is provided between the bearing sleeve and the thrust member, and the flange portion, and supports the flange portion in a non-contact manner in a thrust direction by a dynamic pressure action of the lubricating oil that is generated in a thrust bearing gap, the method comprising the steps of:

forming a press fitting portion, into which the thrust member is press fitted with a predetermined interference, at the one end of the housing;

forming a securing surface, which has a predetermined length in an axial direction and is secured closely to an inner periphery of a retaining member, on an outer periphery of the housing;

receding a deformation region of the securing surface, which deforms radially outward by a predetermined quantity during press fitting of the thrust member, radially inward relative to an other region of the securing surface, by an amount equivalent to an amount of the outward deformation thereof, and press fitting and securing the thrust member inside an inner periphery of the press fitting portion of the housing.

5. A method of producing a dynamic bearing device according to claim 4, wherein the deformation region of the securing surface is provided adjacent to another end of the press fitting portion of the housing.

6. A method of producing a dynamic bearing device according to claim 5, wherein the deformation region of the securing surface is formed in a tapered shape that gradually reduces in diameter toward the one end of the housing.

7. A dynamic bearing device comprising a housing, a bearing sleeve secured to an inner periphery of the housing, an axial member with an axial portion and a flange portion, a thrust member secured to an inner peripheral portion at one end of the housing, a radial bearing portion, which is provided between the bearing sleeve and the axial portion, and supports the axial portion in a non-contact manner in a radial direction by a dynamic pressure action of a lubricating oil that is generated in a radial bearing gap, and a thrust bearing portion, which is provided between the bearing sleeve and the thrust member, and the flange portion, and supports the flange portion in a non-contact manner in a thrust direction by a dynamic pressure action of the lubricating oil that is generated in a thrust bearing gap, wherein the thrust member is press fitted and secured to the inner peripheral portion at the one end of the housing with an adhesive disposed therebetween.

8. A dynamic bearing device according to claim 7, wherein an internal taper shaped space is provided between an outer peripheral portion of the thrust member and the inner peripheral portion at the one end of the housing, for retaining the adhesive, adjacent to a press fitting portion of the thrust member inside the housing.

9. A dynamic bearing device according to claim 8, wherein the outer peripheral portion of the thrust member comprises a tapered surface for forming the internal taper shaped space.

10. A dynamic bearing device according to claim 8, wherein an external taper shaped space is also provided between the outer peripheral portion of the thrust member and the inner peripheral portion at the one end of the housing, for retaining the adhesive, adjacent to the press fitting portion of the thrust member outside the housing.

11. A dynamic bearing device according to claim 10, wherein the outer peripheral portion of the thrust member comprises a tapered surface for forming the external taper shaped space.

12. A dynamic bearing device according to claim 10, wherein the inner peripheral portion at the one end of the housing comprises a step portion, which is positioned within the external taper shaped space, and faces toward an outside of the housing.

13. A method of producing a dynamic bearing comprising a housing, a bearing sleeve secured to an inner periphery of the housing, an axial member with an axial portion and a flange portion, a thrust member secured to an inner peripheral portion at one end of the housing, a radial bearing portion, which is provided between the bearing sleeve and the axial portion, and supports the axial portion in a non-contact manner in a radial direction by a dynamic pressure action of a lubricating oil that is generated in a radial bearing gap, and a thrust bearing portion, which is provided between the bearing sleeve and the thrust member, and the flange portion, and supports the flange portion in a non-contact manner in a thrust direction by a dynamic pressure action of the lubricating oil that is generated in a thrust bearing gap, the method comprising the steps of:

applying an adhesive to the inner peripheral portion at the one end of the housing, and press fitting the thrust member into the inner peripheral portion at the one end of the housing to which the adhesive has been applied.

14. A dynamic bearing device comprising a housing, a bearing sleeve secured to an inner peripheral surface of the housing, an axial member, and a radial bearing portion, which is provided between the bearing sleeve and the axial member, and supports the axial member in a non-contact manner in a radial direction by a dynamic pressure action of a lubricating oil that is generated in a radial bearing gap, wherein the bearing sleeve is secured to the inner peripheral surface of the housing with an adhesive, and a concave adhesive reservoir is provided between an inner peripheral surface of the housing and an outer peripheral surface of the bearing sleeve, and wherein the adhesive reservoir is of a shape that gradually reduces in size in both axial directions.

15. A dynamic bearing device according to claim 14, wherein the adhesive reservoir is provided at the inner peripheral surface of the housing.

16. A dynamic bearing device comprising a housing, a bearing sleeve secured to an inner peripheral surface of the housing, an axial member with an axial portion and a flange portion, a seal portion provided at one end of the housing, a thrust portion provided at another end of the housing, a radial bearing portion, which is provided between the bearing sleeve and the axial portion, and supports the axial portion in a non-contact manner in a radial direction by a dynamic pressure action of a lubricating oil that is generated in a radial bearing gap, and a thrust bearing portion, which is provided between the bearing sleeve and the thrust portion, and the flange portion, and supports the flange portion in a non-contact manner in a thrust direction by a dynamic pressure action of the lubricating oil that is generated in a thrust bearing gap, wherein the lubricating oil is filled in an internal space within the housing, and wherein an inside surface of the seal portion, at an inner diameter side region thereof, partially contacts with an inner diameter side region of an end surface at the one end of the bearing sleeve, and at an outer diameter side region thereof, recedes from the end surface at the one end of the bearing sleeve to form a recessed portion.

17. A dynamic bearing device according to claim 16, wherein the bearing sleeve is secured to the inner peripheral surface of the housing with an adhesive.

18. A motor comprising a rotor, a dynamic bearing device for supporting rotation of the rotor, a retaining member for retaining the dynamic bearing device, and a stator and a rotor magnet, which are provided between the rotor and the retaining member, and oppose each other across a predetermined gap provided therebetween, wherein the dynamic bearing device comprises a housing that is retained by the retaining member, a bearing sleeve secured to an inner periphery of the housing, an axial member with an axial portion and a flange portion, which rotates together with the rotor, a thrust member secured to one end of the housing, a radial bearing portion, which is provided between the bearing sleeve and the axial portion, and supports the axial portion in a non-contact manner in a radial direction by a dynamic pressure action of a lubricating oil that is generated in a radial bearing gap, and a thrust bearing portion, which is provided between the bearing sleeve and the thrust member, and the flange portion, and supports the flange portion in a non-contact manner in a thrust direction by a dynamic pressure action of the lubricating oil that is generated in a thrust bearing gap, wherein the thrust member is press filled inside an inner periphery of a press filling portion provided at the one end of the housing, with a predetermined interference, an outer periphery of the housing has a securing surface, which has a predetermined length in an axial direction and is secured closely within an inner periphery of the retaining member, the securing surface has a deformation region that deforms radially outward by a predetermined quantity during press filling of the thrust member, and with the thrust member in a press fitted state, the securing surface adopts a substantially straight shape in an axial direction, along an entire axial region of the securing surface, and the deformation region of the securing surface comprises a tapered shape, which is adjacent to another end of the press fitting portion of the housing, and which prior to press fitting of the thrust member, gradually reduces in diameter toward the one end of the housing.

19. A motor comprising a rotor, a dynamic bearing device for supporting rotation of the rotor, a retaining member for retaining the dynamic bearing device, and a stator and a rotor magnet, which are provided between the rotor and the retaining member, and oppose each other across a predetermined gap provided therebetween, wherein the dynamic bearing device comprises a housing that is retained by the retaining member, a bearing sleeve secured to an inner periphery of the housing, an axial member with an axial portion and a flange portion, which rotates together with the rotor, a thrust member secured to an inner peripheral portion at one end of the housing, a radial bearing portion, which is provided between the bearing sleeve and the axial portion, and supports the axial portion in a non-contact manner in a radial direction by a dynamic pressure action of a lubricating oil that is generated in a radial bearing gap, and a thrust bearing portion, which is provided between the bearing sleeve and the thrust member, and the flange portion, and supports the flange portion in a non-contact manner in a thrust direction by a dynamic pressure action of the lubricating oil that is generated in a thrust bearing gap, wherein the thrust member is press fitted and secured to the inner peripheral portion at the one end of the housing with an adhesive disposed therebetween, and an internal taper shaped space is provided between an outer peripheral portion of the thrust member and the inner peripheral portion at the one end of the housing, for retaining the adhesive, adjacent to a press fitting portion of the thrust member inside the housing.

20. A motor comprising a rotor, a dynamic bearing device for supporting rotation of the rotor, a retaining member for retaining the dynamic bearing device, and a stator and a rotor magnet, which are provided between the rotor and the retaining member, and oppose each other across a predetermined gap provided therebetween, wherein the dynamic bearing device comprises a housing that is retained by the retaining member, a bearing sleeve secured to an inner periphery of the housing, an axial member that rotates together with the rotor, and a radial bearing portion, which is provided between the bearing sleeve and the axial portion, and supports the axial portion in a non-contact manner in a radial direction by a dynamic pressure action of a lubricating oil that is generated in a radial bearing gap, wherein the bearing sleeve is secured to the inner periphery of the housing with an adhesive, a concave adhesive reservoir is provided between an inner peripheral surface of the housing and an outer peripheral surface of the bearing sleeve, and the adhesive reservoir is of a shape that gradually reduces in size in both axial directions.

21. A motor comprising a rotor, a dynamic bearing device for supporting rotation of the rotor, a retaining member for retaining the dynamic bearing device, and a stator and a rotor magnet, which are provided between the rotor and the retaining member, and oppose each other across a predetermined gap provided therebetween, wherein the dynamic bearing device comprises a housing that is retained by the retaining member, a bearing sleeve secured to an inner peripheral surface of the housing, an axial member with an axial portion and a flange portion, which rotates together with the rotor, a seal portion provided at one end of the housing, a thrust portion provided at another end of the housing, a radial bearing portion, which is provided between the bearing sleeve and the axial portion, and supports the axial portion in a non-contact manner in a radial direction by a dynamic pressure action of a lubricating oil that is generated in a radial bearing gap, and a thrust bearing portion, which is provided between the bearing sleeve and the thrust portion, and the flange portion, and supports the flange portion in a non-contact manner in a thrust direction by a dynamic pressure action of the lubricating oil that is generated in a thrust bearing gap, wherein the lubricating oil is filled in an internal space within the housing, and wherein an inside surface of the seal portion, at an inner diameter side region thereof, partially contacts with an inner diameter side region of an end surface at the one end of the bearing sleeve, and at an outer diameter side region thereof, recedes from the end surface at the one end of the bearing sleeve to form a recessed portion, and the bearing sleeve is secured to an inner peripheral surface of the housing with an adhesive.

* * * * *